United States Patent
Shimura et al.

(10) Patent No.: US 8,957,622 B2
(45) Date of Patent: Feb. 17, 2015

(54) FUEL CELL SYSTEM AND ELECTRONIC DEVICE

(75) Inventors: Jusuke Shimura, Kanagawa (JP); Yuji Uchida, Fukushima (JP)

(73) Assignee: Sony Corporation (JP)

( * ) Notice: Subject to any disclaimer, the term of this patent is extended or adjusted under 35 U.S.C. 154(b) by 679 days.

(21) Appl. No.: 13/143,012

(22) PCT Filed: Jan. 18, 2010

(86) PCT No.: PCT/JP2010/050476
§ 371 (c)(1),
(2), (4) Date: Jun. 30, 2011

(87) PCT Pub. No.: WO2010/084836
PCT Pub. Date: Jul. 29, 2010

(65) Prior Publication Data
US 2011/0266994 A1   Nov. 3, 2011

(30) Foreign Application Priority Data
Jan. 23, 2009   (JP) .................................. 2009-013101

(51) Int. Cl.
*H02J 7/00* (2006.01)
*H02J 7/14* (2006.01)
(Continued)

(52) U.S. Cl.
CPC ......... *H01M 16/006* (2013.01); *B60L 11/1888* (2013.01); *H01M 8/04186* (2013.01); *H01M 8/04373* (2013.01); *H01M 8/04738* (2013.01); *H01M 8/04753* (2013.01); *H01M 8/04491* (2013.01); *H01M 8/04917* (2013.01);
(Continued)

(58) Field of Classification Search
USPC .......... 320/101, 134, 136, 152, 153; 429/413, 429/400, 414, 442, 62, 429
See application file for complete search history.

(56) References Cited

U.S. PATENT DOCUMENTS 7,969,039 B2 *   6/2011   Mimatsu et al. ................ 307/9.1
8,017,276 B2 *   9/2011   Fujita et al. .................... 429/432
(Continued)

FOREIGN PATENT DOCUMENTS

| JP | SHO 53-14342 | 2/1978 |
| JP | HEI 04-137369 | 5/1992 |
| JP | 2002-280034 | 9/2002 |
| JP | 2006-340447 | 12/2006 |
| JP | 2007-305470 | 11/2007 |

(Continued)

*Primary Examiner* — Edward Tso
*Assistant Examiner* — Alexis A Boateng
(74) *Attorney, Agent, or Firm* — Sheridan Ross P.C.

(57) ABSTRACT

The present invention provides a small fuel cell system including a secondary battery, in which deterioration in the secondary battery is suppressed regardless of a temperature condition. A control unit adjusts the supply amount of a liquid fluid of a fuel pump so that charging current I2 to a secondary battery becomes smaller than a predetermined maximum charging current value Imax. Consequently, for example, even in the case of using a small secondary battery, the charging current I2 is limited to be smaller than a predetermined upper limit value (maximum charging current value Imax). In addition, a temperature detecting unit detects temperature T1 of the secondary battery and the control unit controls the maximum charging current value Imax in accordance with the detected temperature T1 of the secondary battery. In such a manner, the operation of limiting the charging current I2 in accordance with the temperature T1 of the secondary battery at that time is performed.

8 Claims, 7 Drawing Sheets

(51) Int. Cl.
*H01M 16/00* (2006.01)
*B60L 11/18* (2006.01)
*H01M 8/04* (2006.01)
*H01M 10/48* (2006.01)
*H01M 8/10* (2006.01)

(52) U.S. Cl.
CPC .......... *H01M10/486* (2013.01); *B60L 11/1892* (2013.01); *H01M 8/1011* (2013.01); *H01M 2250/30* (2013.01); *Y02E 60/523* (2013.01); *Y02E 60/50* (2013.01); *Y02B 90/18* (2013.01)
USPC .......... 320/101; 320/152; 320/153; 320/134; 429/62; 429/429

(56) References Cited

U.S. PATENT DOCUMENTS

| | | |
|---|---|---|
| 2003/0113594 A1* | 6/2003 | Pearson .............................. 429/9 |
| 2006/0141305 A1* | 6/2006 | Kazama ........................... 429/23 |
| 2006/0166045 A1* | 7/2006 | Ryoichi ............................. 429/9 |
| 2007/0087231 A1* | 4/2007 | Pearson .............................. 429/9 |
| 2008/0248351 A1* | 10/2008 | Wake et al. ...................... 429/24 |
| 2008/0278111 A1 | 11/2008 | Genies et al. |

FOREIGN PATENT DOCUMENTS

| | | |
|---|---|---|
| JP | 2008-135303 | 6/2008 |
| JP | 2008-283853 | 11/2008 |

* cited by examiner

FUEL CELL SYSTEM AND ELECTRONIC DEVICE

CROSS REFERENCE TO RELATED APPLICATIONS

The present application is a National Stage of International Application No. PCT/JP2010/050476 filed on Jan. 18, 2010, which claims priority to Japanese Patent Application No. 2009-013101, filed in the Japanese Patent Office on Jan. 23, 2009, the entire contents of which are being incorporated herein by reference.

BACKGROUND

The present invention relates to a fuel cell system including a fuel cell and a secondary battery and an electronic device having such a fuel cell system.

Traditionally, since a fuel cell has high power generation efficiency and does not exhaust harmful substances, it is practically used as an industrial or household power generating device or a power source of a satellite, a space ship, or the like. Further, in recent years, development of a fuel cell as a power source for a vehicle such as a car, a bus, or a truck is expanding. Such a fuel cell is classified into an alkaline aqueous solution type, a phosphoric acid type, a molten carbonate type, a solid oxide type, a direct methanol type, and the like. In particular, a direct methanol fuel cell (DMFC) realizes high energy density by using methanol as a fuel hydrogen source and also realizes miniaturization because a reformer is unnecessary. Therefore, such a DMFC is being studied so as to be used as a small portable fuel cell.

In a DMFC, an MEA (Membrane Electrode Assembly) as a unit cell obtained by sandwiching a solid polymer electrolyte membrane by two electrodes, and integrating and bonding them is used. When one of gas diffusion electrodes is set as a fuel electrode (anode) and methanol is supplied as fuel to the surface of the electrode, the methanol is degraded, and hydrogen ions (protons) and electrons are generated. The hydrogen ions pass through the solid polymer electrolyte membrane. Moreover, when the other gas diffusion electrode is set as an oxygen electrode (cathode) and air as an oxidant gas is supplied to the surface of the electrode, oxygen in the air and the above hydrogen ions and electrons are combined, and water is generated. By such an electrochemical reaction, electromotive force is generated from the DMFC.

Here, in an active fuel cell capable of adjusting the supply amount of the fuel, predetermined time is necessary since fuel supply starts until a steady power generation state is obtained. This is because it takes time for rise in catalyst temperature, moistening of an electrolyte film, and the like. Therefore, since a fuel cell has such characteristics, it is very difficult to cause an electronic device whose power demand dynamically changes to directly operate by a single fuel cell.

Then, to address such an issue, a method of connecting an output of a fuel cell in parallel with a secondary battery such as a lithium ion battery is proposed (for example, patent document 1). With such a configuration, a sharp change in the power demand is addressed by charging/discharging of the secondary battery. Consequently, the fuel cell itself may start slowly and perform only steady power generation. Therefore, by such a hybrid configuration of a fuel cell and a secondary battery, an electronic device whose power demand changes sharply operates stably.

CITATION LIST

Patent Document

Patent document 1: Japanese Unexamined Patent Application Publication No. Sho 53-14342

SUMMARY

However, such a hybrid configuration using a secondary battery still has an issue which is deterioration of a secondary battery itself. Specifically, since a secondary battery used in the hybrid configuration is basically provided to temporarily store an output generated from a fuel cell, it is desirable that the secondary battery is as small as possible. However, when a secondary battery of small capacity is used, inevitably, the maximum charge/discharge current for the nominal capacity increases (that is, large current such as 2C or 3C is charged/discharged). Further, increase in the maximum charge/discharge current causes quick deterioration in the secondary battery, so that deterioration in the secondary battery is a large issue in a hybrid system.

Concretely, it is known that, in a lithium ion battery as one of the secondary batteries, the larger the charging current becomes, the quicker the deterioration advances. The cause of the deterioration phenomenon is that since the chemical reaction at the time of charging in the anode of the lithium ion battery (reaction of intercalation of the lithium ions between layers of carbon as an anode material) is slower than the charging speed, the lithium ion is deposited as metal lithium. Further, since such intercalation reaction becomes slower as the temperature becomes lower, the deterioration phenomenon mentioned above becomes conspicuous particularly when the temperature is low.

In view of the foregoing problems, it is an object of the present invention to provide a small fuel cell system including a secondary battery, in which deterioration in the secondary battery is suppressed regardless of a temperature condition, and an electronic device having such a fuel cell system.

A fuel cell system of an embodiment of the present invention includes: a power generation unit which generates power by supply of fuel and oxidant gas; a fuel supply unit which supplies the fuel to the power generation unit side and is able to adjust a supply amount of the fuel; a secondary battery which stores electromotive force generated by power generation of the power generation unit; a temperature detecting unit which detects temperature of the secondary battery; and a control unit which adjusts the supply amount of the fuel by the fuel supply unit so that charging current to the secondary battery becomes smaller than a predetermined maximum charging current value. Here, the control unit controls the above maximum charging current value in accordance with the temperature of the secondary battery detected by the temperature detecting unit.

An electronic device according to an embodiment of the present invention includes the above fuel cell system.

In a fuel cell system and an electronic device according to an embodiment of the present invention, electromotive force generated by power generation of the power generation unit is stored in a secondary battery, and the fuel supply amount is adjusted so that the charging current to the secondary battery becomes smaller than a predetermined maximum charging current value. With the configuration, for example, even in the case where a small secondary battery is used and the charging current to the secondary battery increases, the charging current is limited to be smaller than a predetermined upper limit value (maximum charging current value). Further, the temperature of the secondary battery is detected and the maximum charging current value is controlled according to the detected temperature of the secondary battery, and thereby enabling the operation of limiting the charging current in accordance with the temperature at that time.

In a fuel cell system and an electronic device according to an embodiment of the present invention, the supply amount of fuel is adjusted so that the charging current to a secondary battery becomes smaller than a predetermined maximum charging current value. Consequently, for example, even in the case of using a small secondary battery, the charging current can be limited to be smaller than a predetermined upper limit value (maximum charging current value), and deterioration in the secondary battery can be suppressed. Further, since the temperature of the secondary battery is detected and the above maximum charging current value is controlled according to the detected temperature of the secondary battery, the operation of limiting the charging current in accordance with the temperature at that time is performed and, for example, acceleration of deterioration in the secondary battery at low temperature is suppressed. Therefore, in the fuel cell system including the secondary battery, while realizing miniaturization, deterioration in the fuel cell is suppressed regardless of the temperature condition.

Additional features and advantages of the present invention are described herein, and will be apparent from the following Detailed Description and the Figures.

DETAILED DESCRIPTION

Embodiments of the present invention will be described in detail below with reference to the drawings. The description will be given in the following order.

1. Embodiment (example of operation of controlling charging current according to detection temperature in a secondary battery)

2. Modification and Application Example

Embodiment

Example of General Configuration of Fuel Cell System

Figure 1:
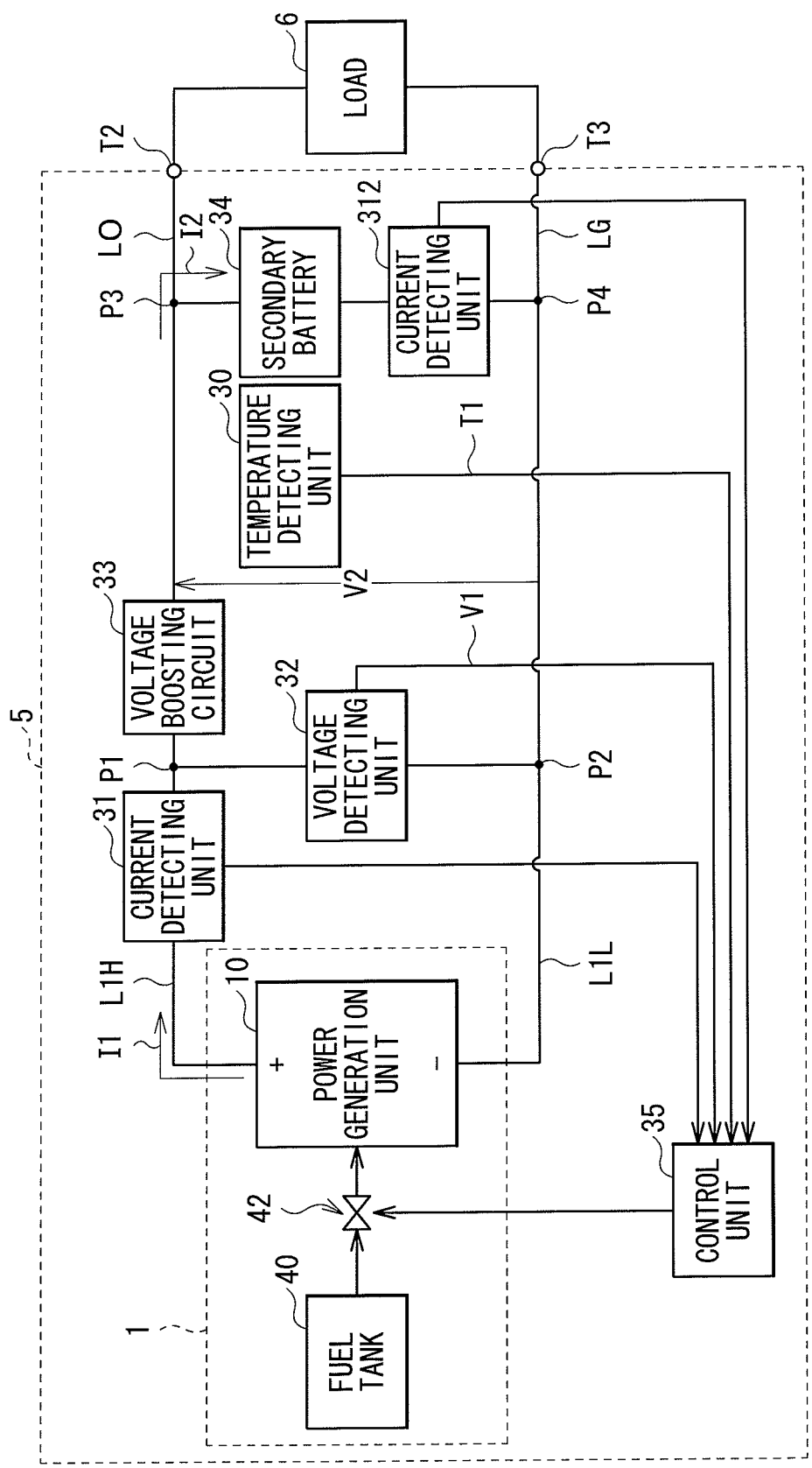
FIG. 1 is a block diagram illustrating a general configuration of a fuel cell system according to an embodiment of the present invention.

FIG. 1 illustrates a general configuration of a fuel cell system (fuel cell system 5) according to an embodiment of the present invention. The fuel cell system 5 supplies power for driving a load 6 via output terminals T2 and T3. The fuel supply system 5 includes a fuel cell 1, two current detecting units 311 and 312, a voltage detecting unit 32, a voltage boosting circuit 33, a temperature detecting unit 30, a secondary battery 34, and a control unit 35.

The fuel cell 1 includes a power generation unit 10, a fuel tank 40, and a fuel pump 42. Note that the detailed configuration of the fuel cell 1 will be described later.

The power generation unit 10 is a direct methanol power generation unit which generates power by reaction between methanol and oxidant gas (for example, oxygen) and is constructed by including a plurality of unit cells each having a cathode (oxygen electrode) and an anode (fuel electrode). Note that the detailed configuration of the power generation unit 10 will be described later.

The fuel tank 40 stores therein liquid fuel necessary for power generation (for example, methanol or methanol aqueous solution).

The fuel pump 42 is a pump for pumping the liquid fuel stored in the fuel tank 40 up and supplying (transporting) it to the power generation unit 10 side, and can adjust the fuel supply amount. Further, such operation (operation of supplying the liquid fuel) of the fuel supply pump 42 is controlled by the control unit 35 which will be described later. Note that the detailed configuration of the fuel pump 42 will be described later.

The current detecting unit 311 is disposed between the cathode side of the power generation unit 10 and a connection point P1 on a connection line L1H and detects current I1 generated by the power generation unit 10. The current detecting unit 311 includes, for example, a resistor. Alternatively, the current detecting unit 311 may be disposed on a connection line L1L (between the anode side of the power generation unit 10 and a connection point P2).

The voltage detecting unit 32 is disposed between the connection point P1 on the connection line L1H and the connection point P2 on the connection line L1L and detects voltage V1 generated by the power generation unit 10. The voltage detecting unit 32 includes, for example, a resistor.

The voltage boosting circuit 33 is disposed between the connection line L1H and a connection point P3 on an output line LO, and is a voltage converter for generating a DC voltage V2 by boosting the voltage V1 (DC voltage) generated by the power generation unit 10. The voltage boosting circuit 33 is constructed by, for example, a DC/DC converter.

The secondary battery 34 is disposed between the connection point P3 on the output line LO and a connection point P4 on a ground line LG (connection line L1L) and stores power on the basis of the DC voltage V2 generated by the voltage boosting circuit 33. That is, the secondary battery 34 is provided to store electromotive force generated by the power generation of the power generation unit 10. Such a secondary battery 34 is constructed by, for example, a lithium ion battery.

The current detecting unit 312 is disposed between the secondary battery 34 and the connection point P4 and detects charging current I2 which is used at the time of charging the secondary battery 34. The current detecting unit 312 also includes, for example, a resistor. Alternatively, such a current detecting unit 312 may be disposed between the connection point P3 and the secondary battery 34. The current detecting unit 312 corresponds to a concrete example of a "current detecting unit" in the present invention.

The temperature detecting unit 30 detects temperature T1 of the secondary battery 34 (concretely, temperature in the periphery or vicinity of the secondary battery 34) and is constructed by, for example, a thermistor or the like.

The control unit 35 adjusts the supply amount of a liquid fuel 41 by the fuel pump 42 on the basis of the generated current I1 and the charging current I2 (detected current) detected by the current detecting units 311 and 312, the generated voltage (detected voltage) V1 detected by the voltage detecting unit 32, and the temperature (detected temperature) T1 of the secondary battery 34 detected by the temperature detecting unit 30. Concretely, in the embodiment, particularly, the supply amount of the liquid fuel 41 is adjusted so that the charging current I2 becomes smaller than a predetermined maximum charging current value Imax which will be described later by using the detected charging current I2 and the detected temperature T1 of the secondary battery 34. Such a control unit 35 is constructed by, for example, a microcomputer. Note that the detailed operation of the control unit 35 will be described later.

Example of Detailed Configuration of Fuel Cell

Figure 2:
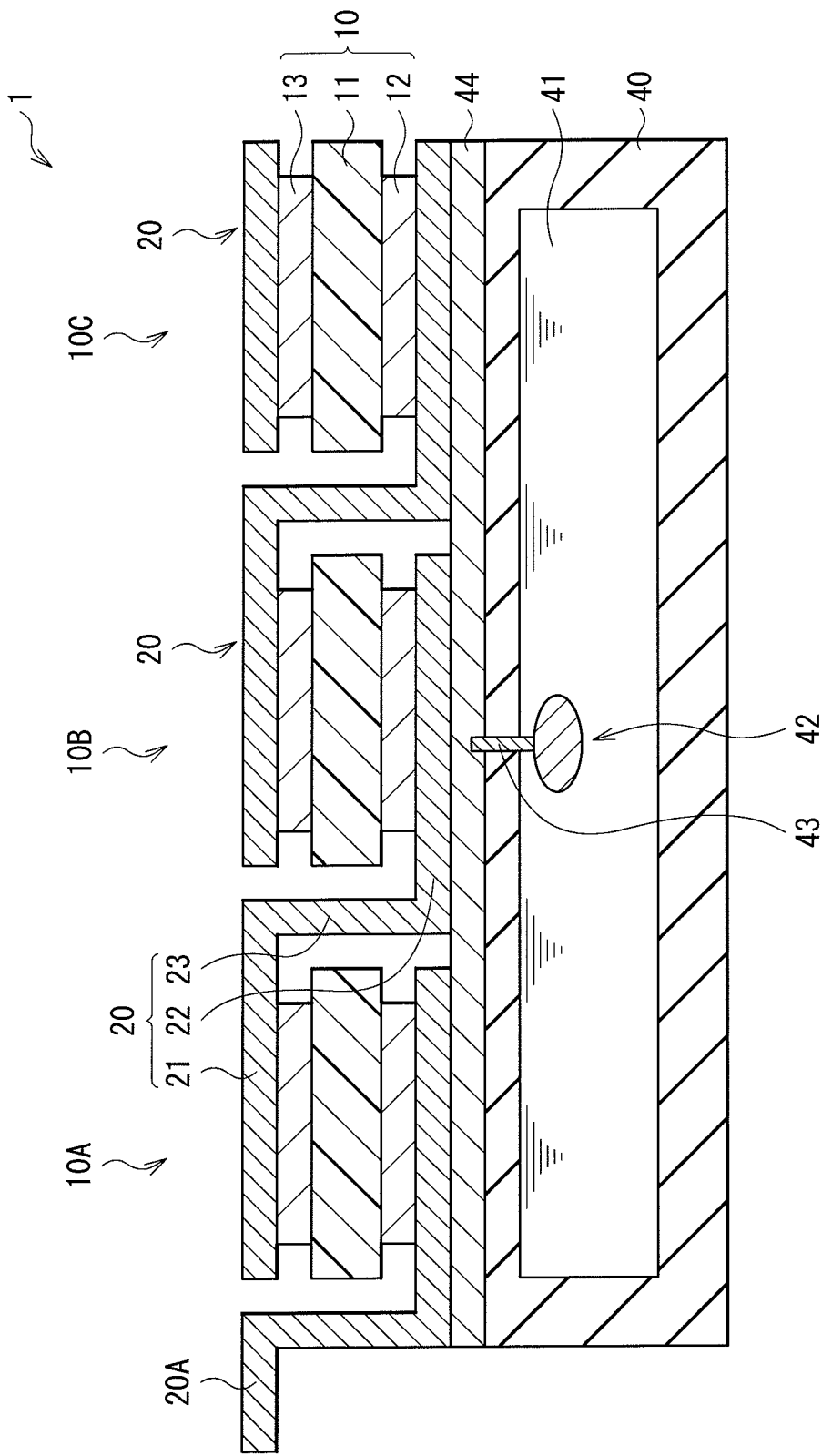
FIG. 2 is a cross section illustrating an example of a schematic configuration of a power generation unit illustrated in FIG. 1.
Figure 3:
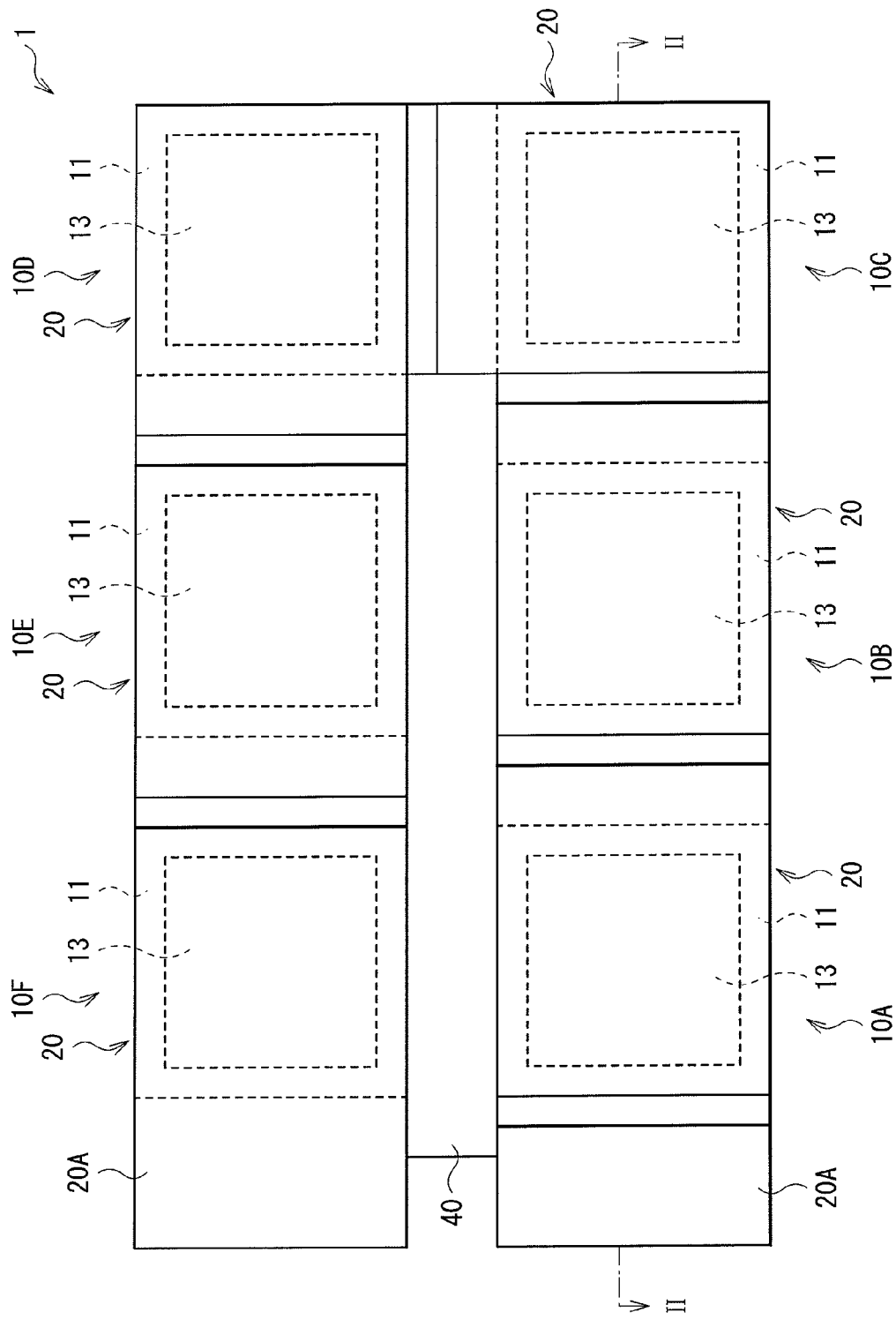
FIG. 3 is a plan view illustrating an example of a schematic configuration of the power generation unit illustrated in FIG. 1.
Figure 4:
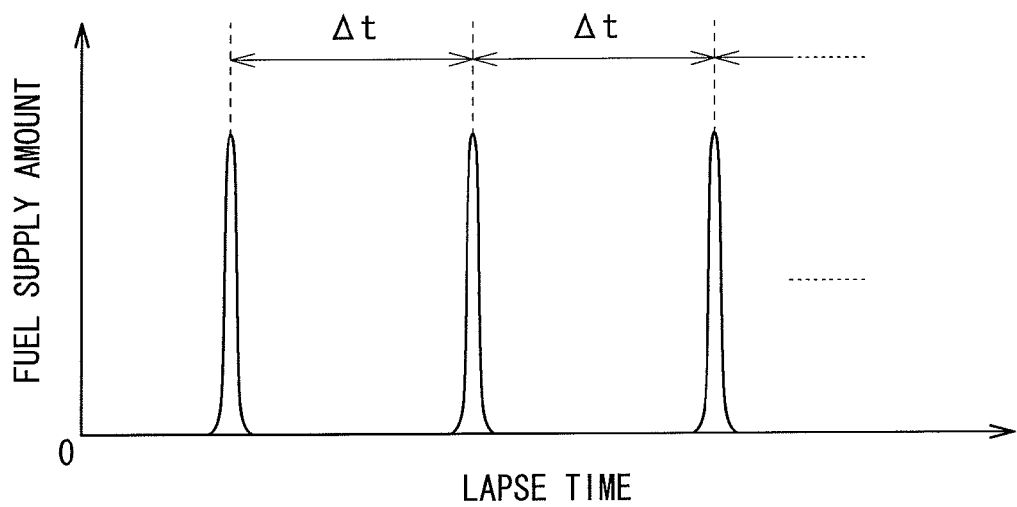
FIG. 4 is a characteristic diagram for explaining outline of a fuel supply method of a vaporization type.

Next, with reference to FIGS. 2 to 4, the detailed configuration of the fuel cell 1 will be described. FIGS. 2 and 3 show a configuration example of unit cells 10A to 10F in the power generation unit 10 in the fuel cell 1. FIG. 2 corresponds to a sectional configuration taken along line II-II in FIG. 3.

The unit cells 10A to 10F are disposed in, for example, three rows by two columns in the in-plane direction and are constructed as a plane stack structure in which they are electrically connected in series by a plurality of connection members 20. Terminals 20A as extension parts of the connection members 20 are attached to the unit cells 10C and 10F. The fuel tank 40, the fuel pump 42, a nozzle 43, and a fuel vaporization unit 44 are provided below the unit cells 10A to 10F.

Each of the unit cells 10A to 10F has a fuel electrode (anode, anode electrode) 12 and an oxygen electrode 13 (cathode, cathode electrode) which are disposed opposed to each other with an electrolyte film 11 therebetween.

The electrolyte film 11 is made of, for example, a proton conducting material having a sulfonate group ($-SO_3H$). Examples of the proton conducting material include a polyperfuluoroalkyl sulfonic acid-based proton conducting material (for example, "Nafion" (registered trademark) made by DuPont), a hydrocarbon-based proton conducting material such as polyimide sulfonic acid, and a fullerene-based proton conducting material.

The fuel electrode 12 and the oxygen electrode 13 have, for example, a configuration that a catalyst layer including catalyst such as platinum (Pt) or ruthenium (Ru) is formed in a current collector made of carbon paper or the like. The catalyst layer is constructed by making supporting members such as carbon black supporting the catalyst dispersed in a polyperfuluoroalkyl sulfonic acid-based proton conducting material or the like. In addition, a not-illustrated air supply pump may be connected to the oxygen electrode 13, or the oxygen electrode 13 may be communicated with the outside via an opening (not illustrated) formed in the connection member 20 so that air, that is, oxygen may be supplied by natural ventilation.

The connection member 20 has a bent part 23 between two flat parts 21 and 22 and is in contact with the fuel electrode 12 of a unit cell (for example, 10A) in the flat part 21 and is in contact with the oxygen electrode 13 of an adjacent unit cell (for example, 10B) in the other flat part 22. The connection member 20 electrically connects adjacent two unit cells (for example, 10A and 10B) in series and also has the function of a current collector of collecting electricity generated by each of the unit cells 10A to 10F. For example, such a connection member 20 has a thickness of 150 μm and is made of copper (Cu), nickel (Ni), titanium (Ti), or stainless steel (SUS), or may be plated with gold (Au), platinum (Pt), or the like. Further, the connection member 20 has an opening (not illustrated) for supplying fuel and air to the fuel electrode 12 and the oxygen electrode 13 and is constructed by, for example, meshes such as expanded metal, punching metal, or the like. Alternatively, the bent part 23 may be preliminarily bent in accordance with the thickness of the unit cells 10A to 10F. In the case where the connection member 20 is made of mesh or the like having a thickness of 200 μm or less and has flexibility, the bent part 23 may be formed by being bent in a manufacturing process. Such a connection member 20 is joined to each of the unit cells 10A to 10F by, for example, screwing a sealing member (not illustrated) such as PPS (polyphenylene sulfide), silicone rubber, or the like provided in the periphery of the electrolyte film 11 to the connection member 20.

For example, the fuel tank 40 is constructed by a container (for example, plastic bag) whose volume changes according to increase/decrease in the liquid fuel 41 without forming bubbles on the inside and a case (structure) having a rectangular parallelepiped shape covering the container. The fuel pump 42 for sucking the liquid fuel 41 in the fuel tank 40 and exhausting it via the nozzle 43 is provided in an upper part around the center of the fuel tank 40.

The fuel pump 42 includes, for example, a piezoelectric member (not illustrated), a piezoelectric member supporting resin unit (not illustrated) for supporting the piezoelectric member, and a passage (not illustrated) as a pipe connecting the fuel tank 40 and the nozzle 43. For example, as illustrated in FIG. 4, the fuel pump 42 adjusts the supply amount of the fuel in accordance with a change in a fuel supply amount per operation or an operation supply cycle Δt. In addition, the fuel pump 42 corresponds to a concrete example of a "fuel supply unit" in the present invention.

The fuel vaporization unit 44 vaporizes the liquid fuel supplied by the fuel pump 42 and supplies the gas fuel to the power generation unit 10 (the unit cells 10A to 10F). The fuel vaporization unit 44 is constructed by, for example, providing a diffusing unit (not illustrated) for accelerating diffusion of the fuel on a plate (not illustrated) made of a metal or alloy containing stainless steel, aluminum or the like or a high-rigidity resin material such as cycloolefin copolymer (COC). For the diffusion unit, an inorganic porous material such as alumina, silica, or titanium oxide or a resin porous material may be used.

The nozzle 43 is an exhaust nozzle of the fuel carried through the passage (not illustrated) of the fuel pump 42 and injects the fuel toward the diffusion unit provided on the surface of the fuel vaporization unit 44. Thereby, the fuel transported to the fuel vaporization unit 44 is diffused and vaporized and supplied toward the power generation unit 10 (the unit cells 10A to 10F). The nozzle 43 has, for example, a diameter of 0.1 mm to 0.5 mm both inclusive.

Example of Method of Manufacturing Fuel Cell System

The fuel cell system 5 of the embodiment is manufactured, for example, as follows.

First, the electrolyte film 11 made of the above-described material is sandwiched between the fuel electrode 12 and the oxygen electrode 13 each made of the above-described material and thermally compressed to join the fuel electrode 12 and the oxygen electrode 13 to the electrolyte film 11, thereby forming the unit cells 10A to 10F.

Figure 5:
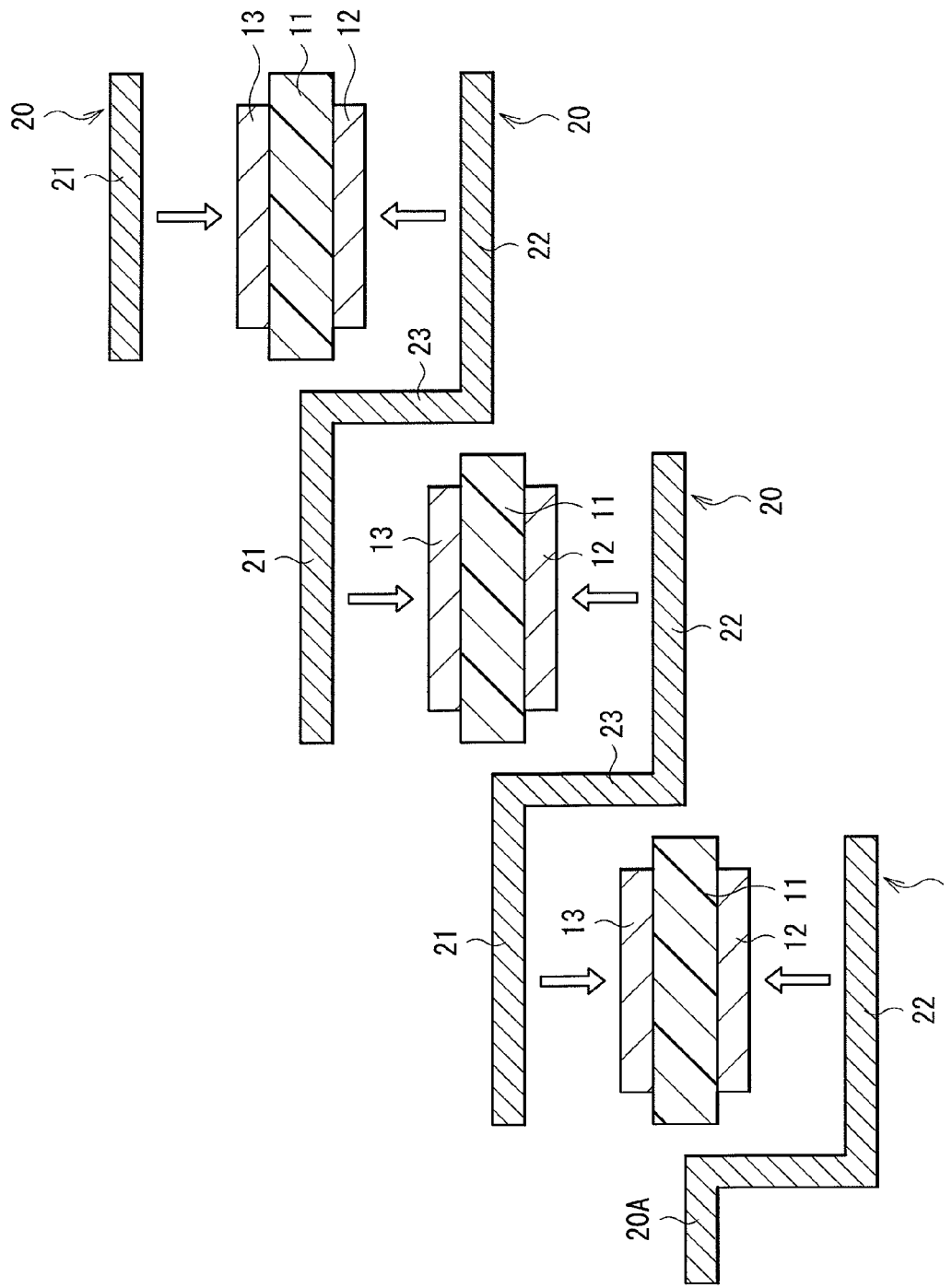
FIG. 5 is a cross section for explaining a method of manufacturing the power generation unit illustrated in FIG. 1.
Figure 6:
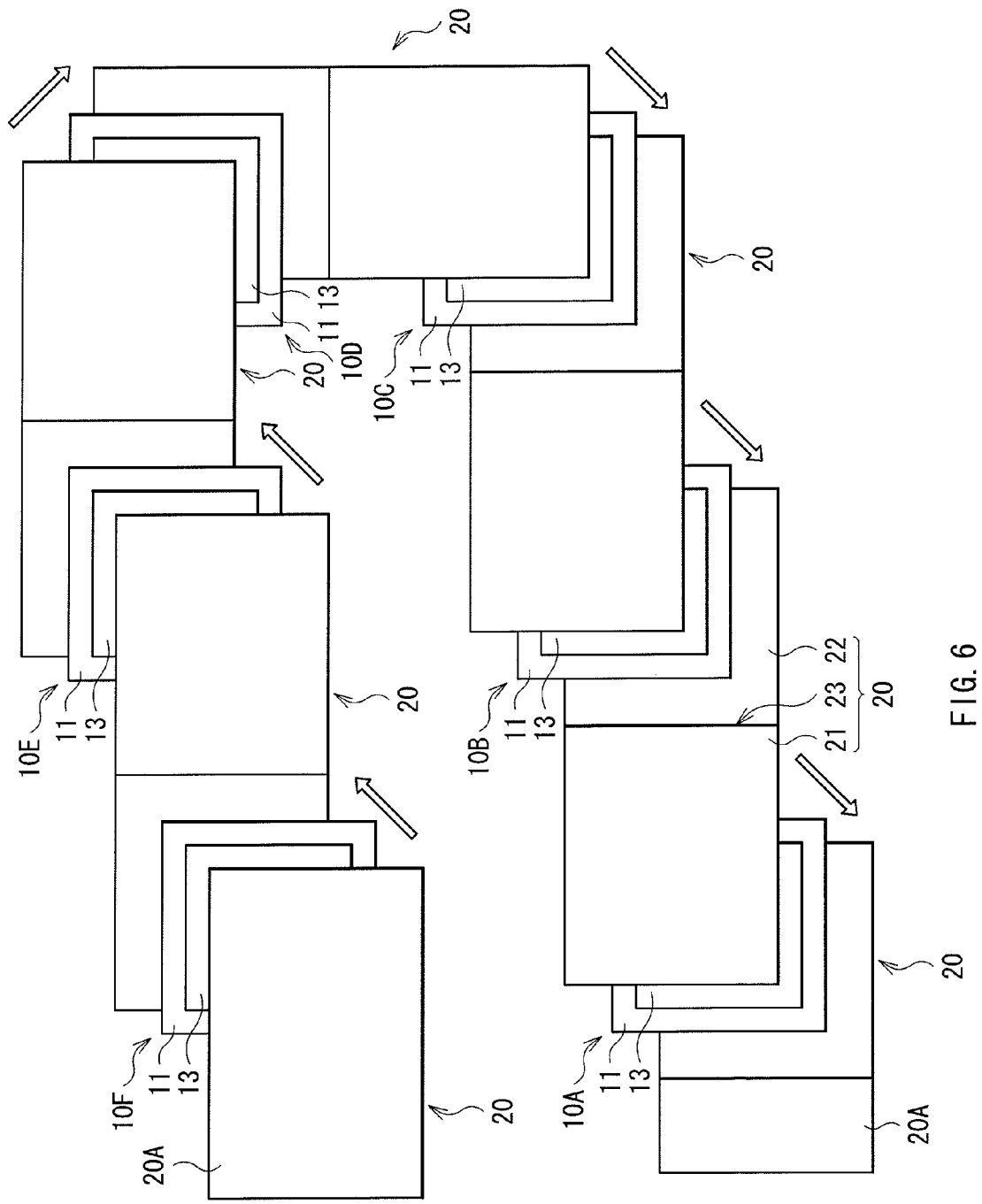
FIG. 6 is a plan view for explaining the method of manufacturing the power generation unit illustrated in FIG. 1.

Subsequently, the connection member 20 made of the above-described material is prepared and, as illustrated in FIGS. 5 and 6, the six unit cells 10A to 10F are disposed in three rows by two columns and electrically connected in series by the connection members 20. In addition, a sealing member (not illustrated) made of the above-described material is provided around the electrolyte film 11 and is screwed to the bent part 23 of the connection member 20.

After that, by disposing the fuel tank 40 storing the liquid fuel 41 and provided with the fuel pump 42, the nozzle 43, and the like on the fuel electrode 12 side of the coupled unit cells 10A to 10F, the fuel cell 1 is formed. To the fuel cell 1, the current detecting units 311 and 312, the voltage detecting unit 32, the temperature detecting unit 30, the voltage boosting circuit 33, the secondary battery 34, and the control unit 35 are electrically connected as illustrated in FIG. 1. As a result, the fuel cell system 5 illustrated in FIGS. 1 to 3 is completed.

Operation and Effect of Fuel Cell System

Next, the operation and effect of the fuel cell system 5 of the embodiment will be described in detail.

In the fuel cell system 5, the liquid fuel stored in the fuel tank 40 is pumped up by the fuel pump 42 and reaches the fuel vaporization unit 44 via the channel (not illustrated). In the fuel vaporization unit 44, when the liquid fuel is injected from the nozzle 43, the liquid fuel is diffused to a wide range by the diffusion part (not illustrated) provided on the surface. Accordingly, the liquid fuel is naturally vaporized, and the gas fuel is supplied to the power generation unit 10 (concretely, the fuel electrodes 12 in the unit cells 10A to 10F).

On the other hand, air (oxygen) is supplied by natural ventilation or an air supply pump (not illustrated) to the oxygen electrodes 13 in the power generation unit 10. In the oxygen electrodes 13, the reaction expressed by the following formula (1) occurs and hydrogen ions and electrons are generated. The hydrogen ions pass through the electrolyte film 11 and reach the fuel electrode 12. In the fuel electrode 12, the reaction expressed by the following formula (2) occurs and water and carbon dioxide are generated. Therefore, in the fuel cell 1 as a whole, the reaction expressed by the following formula (3) occurs, and power is generated.

$$CH_3OH + H_2O \rightarrow CO_2 + 6H^+ + 6e^- \quad (1)$$

$$6H^+ + (3/2)O_2 + 6e^- \rightarrow 3H_2O \quad (2)$$

$$CH_3OH + (3/2)O_2 \rightarrow CO_2 + 2H_2O \quad (3)$$

Consequently, a part of chemical energy of the liquid fuel 41, that is, methanol is converted to electric energy, and the electric energy is collected by the connection members 20 and extracted as current (generated current I1) from the power generation unit 10. The generated voltage (DC voltage) V1 based on the generated current I1 is boosted (converted) by the voltage boosting circuit 33 to become the DC voltage V2. The DC voltage V2 is supplied to the secondary battery 34 or the load (for example, the electronic device body). Then, when the DC voltage V2 and the charged current I2 are supplied to the secondary battery 34, the electromotive force generated by the power generation of the power generation unit 10 on the basis of the voltage and the current is accumulated in the secondary battery 34. Moreover, when the DC voltage V2 is supplied to the load 6 via the output terminals T2 and T3, the load 6 is driven and predetermined operation is performed.

At this time, in the fuel pump 42, the fuel supply amount is adjusted according to a change in the fuel supply amount per operation or the fuel supply cycle Δt by the control of the control unit 35.

Here, in the case of using the secondary battery 34 of small capacitance to realize miniaturization, inevitably, the maximum charge/discharge current for the nominal capacity increases (that is, large current such as 2C or 3C is charged/discharged). Further, increase in the maximum charge/discharge current causes quick deterioration in the secondary battery 34.

Concretely, for example, in the case where the secondary battery 34 is a lithium ion battery, the larger the charging current I2 becomes, the quicker the cell is deteriorating. The reason is that since the chemical reaction at the time of charging in the anode of the lithium ion battery (reaction of intercalation of the lithium ions between layers of carbon as an anode material) is slower than the charging speed, the lithium ion is deposited as metal lithium. Further, since such intercalation reaction becomes slower as the temperature becomes lower, the deterioration phenomenon becomes conspicuous particularly when the temperature is low.

Figure 7:
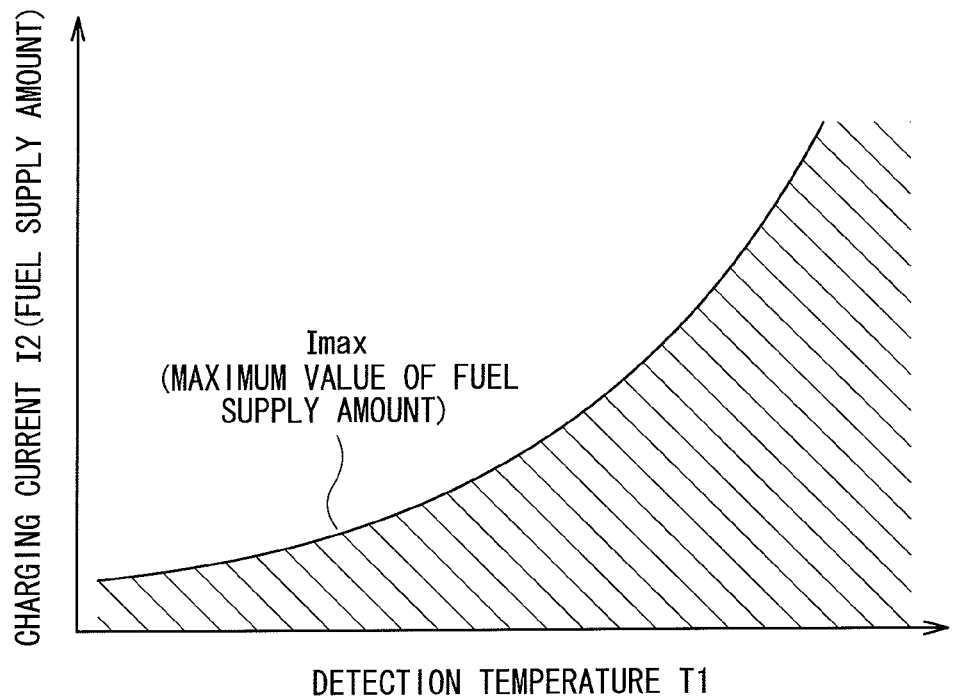
FIG. 7 is a characteristic diagram for explaining an operation of adjusting a fuel supply amount (operation of controlling charging current) according to detection temperature in a secondary battery by a control unit illustrated in FIG. 1.

Then, in the embodiment, for example, the control unit 35 adjusts the charging current I2 (fuel supply amount) on the basis of the charging current I2 detected by the current detecting unit 312 and the temperature T1 of the secondary battery 34 detected by the temperature detecting unit 30 as illustrated in FIG. 7. Concretely, the control unit 35 adjusts the supply amount of the liquid fuel 41 by the fuel pump 42 so that the charging current I2 to the secondary battery 34 becomes smaller than the predetermined maximum charge current value Imax (so that the supply amount of the liquid fuel 41 becomes equal to or less than the predetermined maximum value).

In such a manner, for example, even in the case where the charging current I2 to the secondary battery 34 is increased by using a small-sized secondary battery 34, the charging current I2 is limited to be smaller than the predetermined upper limit value (the maximum charging current value Imax).

Moreover, the control unit 35 similarly controls the magnitude of the maximum charging current Imax in accordance with the temperature T1 of the secondary battery 34 detected as illustrated in FIG. 7. Concretely, the control unit 35 controls the maximum charging current Imax so as to be decreased as the temperature T1 of the secondary battery 34 decreases. More concretely, for example, as illustrated in FIG. 7, the control unit 35 controls so that the maximum charging current value Imax decreases exponentially as the temperature T1 of the secondary battery 34 decreases. In such a manner, the operation of limiting the charging current I2 in accordance with the temperature of the secondary battery 34 at that time is realized.

As described above, in the embodiment, the supply amount of the liquid fuel 41 is adjusted so that the charging current I2 to the secondary battery 34 becomes smaller than the predetermined maximum charging current value Imax. Consequently, for example, even in the case of using the small secondary battery 34, the charging current I2 is limited to be smaller than the predetermined upper limit value (the maximum charging current value Imax), and deterioration in the secondary battery 34 can be suppressed. Further, since the temperature T1 of the secondary battery 34 is detected and the maximum charging current value Imax is controlled according to the detected temperature T1 of the secondary battery 34, the operation of limiting the charging current I2 according to the temperature T1 of the secondary battery 34 at that time is realized. For example, acceleration of deterioration in the secondary battery 34 at low temperature can be suppressed. Therefore, in the fuel cell system including the secondary battery, while realizing miniaturization, deterioration in the secondary battery can be suppressed regardless of the temperature condition.

Furthermore, since the maximum charging current value Imax is controlled so that the maximum charging current value Imax decreases (exponentially) as the temperature T1 of the secondary battery 34 decreases. Therefore, in the case of using a lithium ion battery as the secondary battery 34, acceleration in deterioration at low temperature is suppressed.

Example

Figure 8:
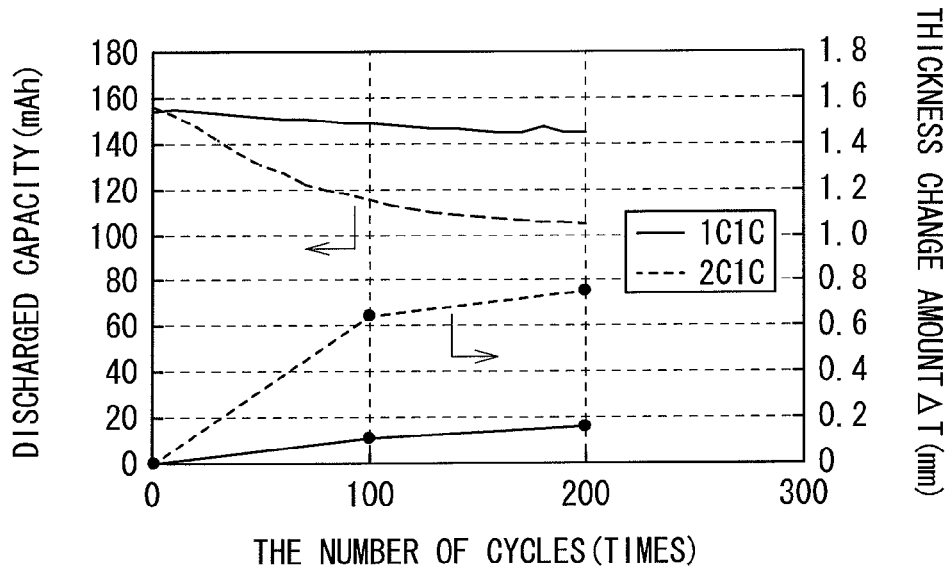
FIG. 8 is a characteristic diagram illustrating an example of the relations among the number of cycles, discharged capacity, and a thickness change amount in a secondary battery.

Here, FIG. 8 illustrates an example of the relations among the number of cycles (times), discharged capacity (mAh), and a thickness change amount ΔT (mm) in a lithium ion battery in the case of using a lithium ion battery as the secondary battery 34. In this case, two kinds of cycle tests are conducted: a cycle test of repeating 1C charge and 1C discharge (corresponding to "1C1C" in the diagram); and a cycle test of repeating 2C charge and 1C discharge (corresponding to "2C1C" in the diagram). The "1C charge (1C discharge)" denotes, for example, in the case where current capacity of a lithium ion battery is 1,000 mAh, charging operation (discharging operation) using charging current (discharging current) (that is, 1,000 mA) with which charging (discharging) is completed in one hour. Similarly, for example, in the case where the current capacity of a lithium ion battery is 1,000 mAh, "2C charge" denotes charging operation with charging current (that is, 2,000 mA) with which charging is completed in 0.5 hour. In addition, the charging operation is performed with CC-CV (upper limit voltage=4.2 V, 0.05 C cut), and the discharging operation is performed with 3.0 V cut.

It is understood from FIG. 8 that the discharged capacity in the case of performing the charging operation with 2C ("2C1C" in the diagram) is conspicuously lower than that in the case of performing the charging operation with 1C ("1C1C" in the diagram) and the thickness change amount ΔT in the former case is also larger. It was therefore confirmed that deterioration in the lithium ion battery is suppressed more in the case of limiting the charging current I2 ("1C1C" in the diagram) than the other case.

2. Modification and Application Example

Although the present invention has been described above by the embodiment, the invention is not limited to the embodiment but may be variously modified.

For example, although the case of adjusting the supply amount of the liquid fuel by the fuel pump 42 on the basis of the generated current I1, the charging current I2, the generated voltage V1, and the temperature T1 of the secondary battery 34 which are detected in the control unit 35 has been described in the foregoing embodiment, the invention is not limited to the case. Concretely, for example, in the control unit 35, the supply amount of the liquid fuel by the fuel pump 42 may be adjusted on the basis of only the charging current I2 and the temperature T1 of the secondary battery as the minimum configuration.

Further, although the case where the control unit 35 controls so that the maximum charging current value Imax decreases exponentially as the detected temperature T1 of the secondary battery 34 decreases has been described in the foregoing embodiment, the method of controlling the maximum charging current value Imax is not limited to the embodiment. That is, another control method may be employed as long as the maximum charging current value Imax is controlled to decrease as the detected temperature T1 of the secondary battery 34 decreases.

Further, although the case where the power generation unit 10 includes six unit cells electrically connected in series has been described in the foregoing embodiment, the number of unit cells is not limited to six. For example, the power generation unit 10 may be constructed by a single unit cell or arbitrary plural number of unit cells of two or more.

In addition, although the case where the fuel tank 40 storing the liquid fluid 41 is provided in the fuel cell system 5 has been described in the foregoing embodiment, such a fuel tank may be detachable from the fuel cell system In addition, although a fuel pump of the vaporization supply type has been described as an example in the foregoing embodiment, the configuration of the fuel pump is not limited to such a vaporization supply type. The present invention is also effective to a fuel cell system which generates power by circulating fuel.

In addition, further, although the direct methanol fuel cell system has been described in the foregoing embodiment, the present invention may be also applied to a fuel cell system of a kind other than the direct methanol type.

The fuel cell system of an embodiment of the present invention is suitably applied to a portable electronic device such as a cellular phone, an electrophotographic device, an electronic diary, or a PDA (Personal Digital Assistance).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell system comprising:
   a power generation unit configured to generate power by supply of fuel and oxidant gas;
   a fuel supply unit configured to:
     (a) supply a supply amount of the fuel to the power generation unit side; and
     (b) adjust the supply amount;
   a secondary battery configured to store electromotive force generated by power generation of the power generation unit;
   a first current detecting unit configured to detect a generated current of the power generation unit;
   a second current detecting unit configured to detect a charging current of the secondary battery;
   a temperature detecting unit configured to detect temperature of the secondary battery; and
   a control unit configured to:
     (a) adjust the supply amount based on the detected temperature, the generated current, and the charging current, so that the charging current becomes smaller than a predetermined maximum charging current value; and
     (b) control the maximum charging current value based on the detected temperature of the secondary battery.

2. The fuel cell system of claim 1, wherein the control unit is configured to control so that the maximum charging current value decreases as the detected temperature of the secondary battery decreases.

3. The fuel cell system of claim 2, wherein the control unit is configured to control so that the maximum charging current value decreases exponentially as the detected temperature of the secondary battery decreases.

4. The fuel cell system of claim 1, which includes a current detecting unit configured to detect the charging current, wherein by using the charging current detected by the current detecting unit, the control unit adjusts the supply amount of the fuel by the fuel supply unit so that the charging current becomes smaller than the maximum charging current value.

5. The fuel cell system of claim 1, wherein the fuel supply unit is configured to supply liquid fuel to the power generation unit side, and a fuel vaporization unit which: (a) vaporizes the" liquid fuel supplied from the fuel supply unit; and (b) supplies gas fuel to the power generation unit is provided.

6. The fuel cell system of claim 1, which includes a fuel tank configured to store the fuel.

7. The fuel cell system of claim 1, wherein the secondary battery includes a lithium ion battery.

8. An electronic device comprising:
a fuel cell system including:
(a) a power generation unit configured to generate power by supply of fuel and oxidant gas;
(b) a fuel supply unit configured to:
  (i) supply a supply amount of the fuel to the power generation unit side; and
  (ii) adjust the supply amount;
(c) a secondary battery configured to store electromotive force generated by power generation of the power generation unit;
(d) a first current detecting unit configured to detect a generated current of the power generation unit;
(e) a second current detecting unit configured to detect a charging current to the secondary battery;
(f) a temperature detecting unit configured to detect temperature of the secondary battery; and
(g) a control unit configured to:
  (i) adjust the supply amount based on the detected temperature, the generated current, and the charging current, so that the charging current becomes smaller than a predetermined maximum charging current value; and
  (ii) control the predetermined maximum charging current value based on the detected temperature of the secondary battery.

* * * * *